Oct. 12, 1937.     H. D. THWEATT ET AL     2,095,299
MOLDING PRESS
Filed Nov. 9, 1936     6 Sheets-Sheet 1
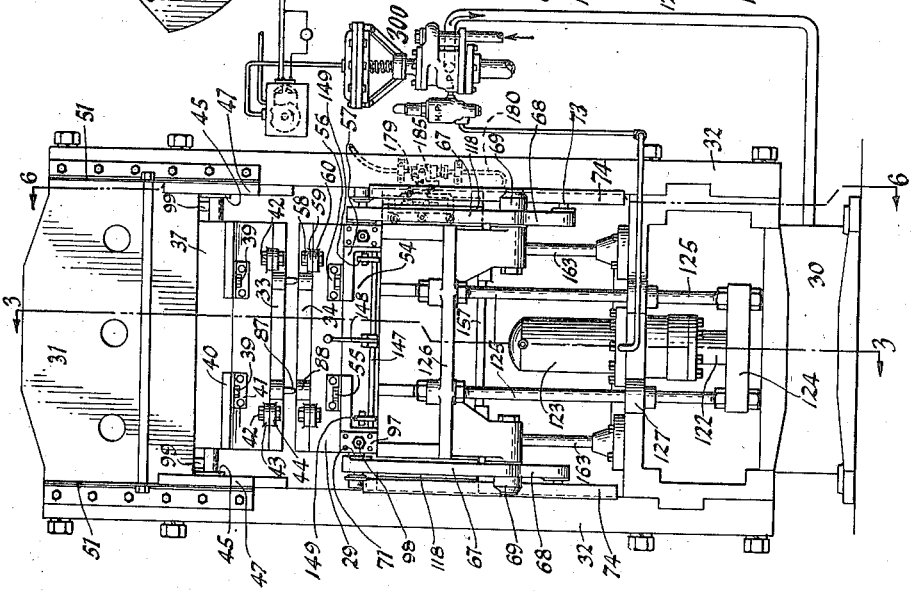

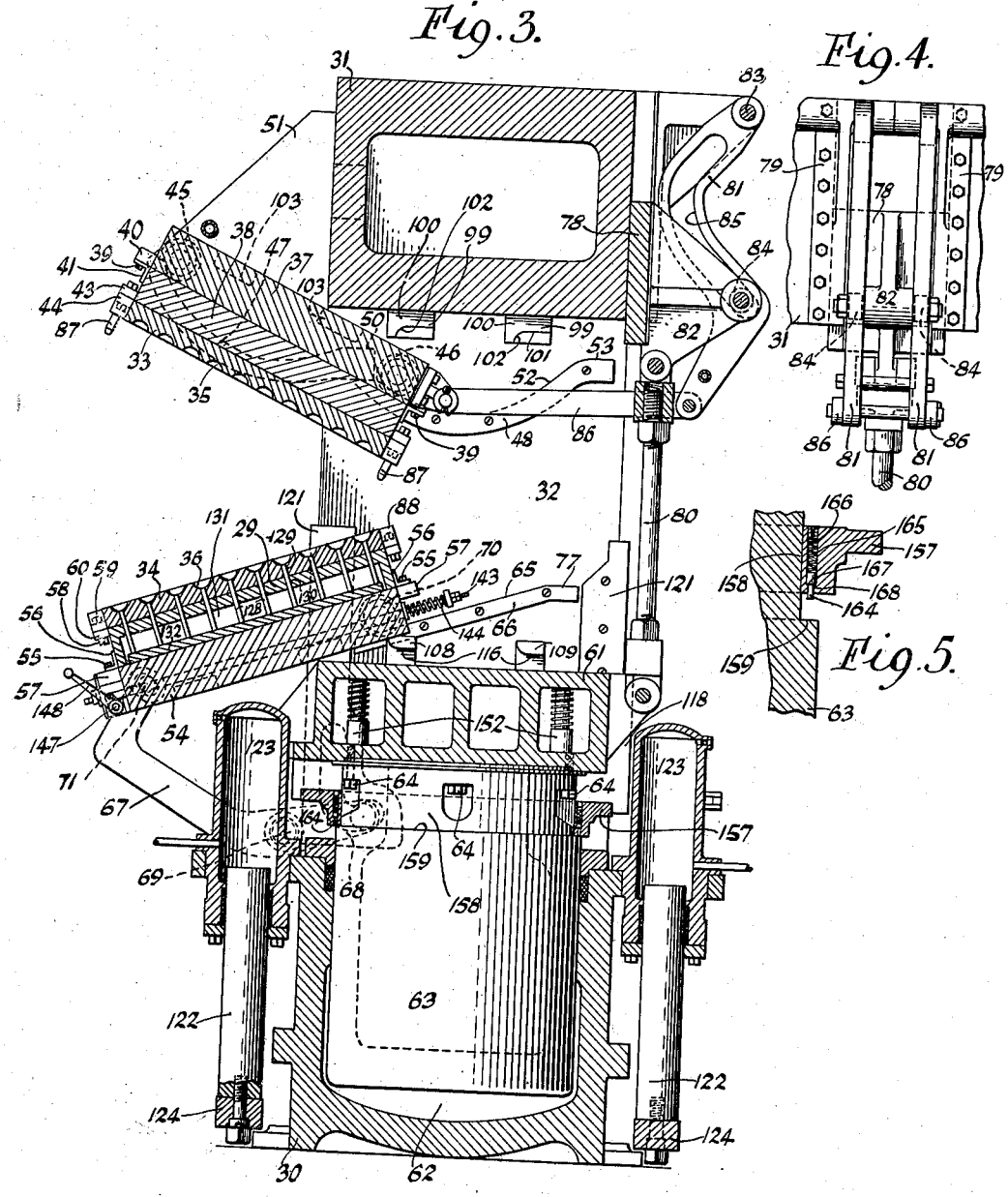

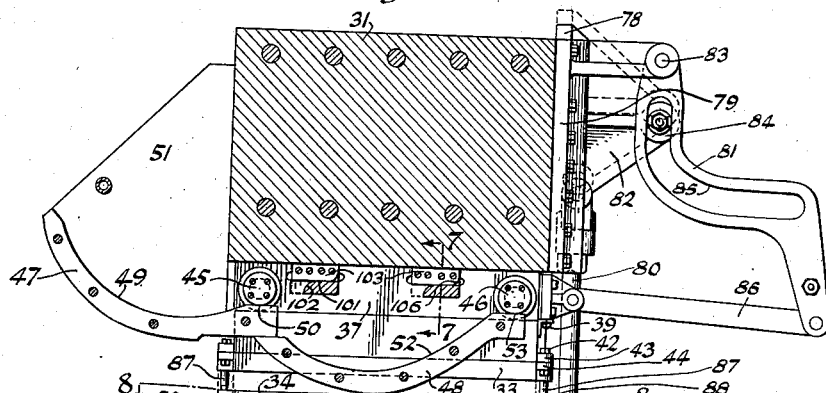

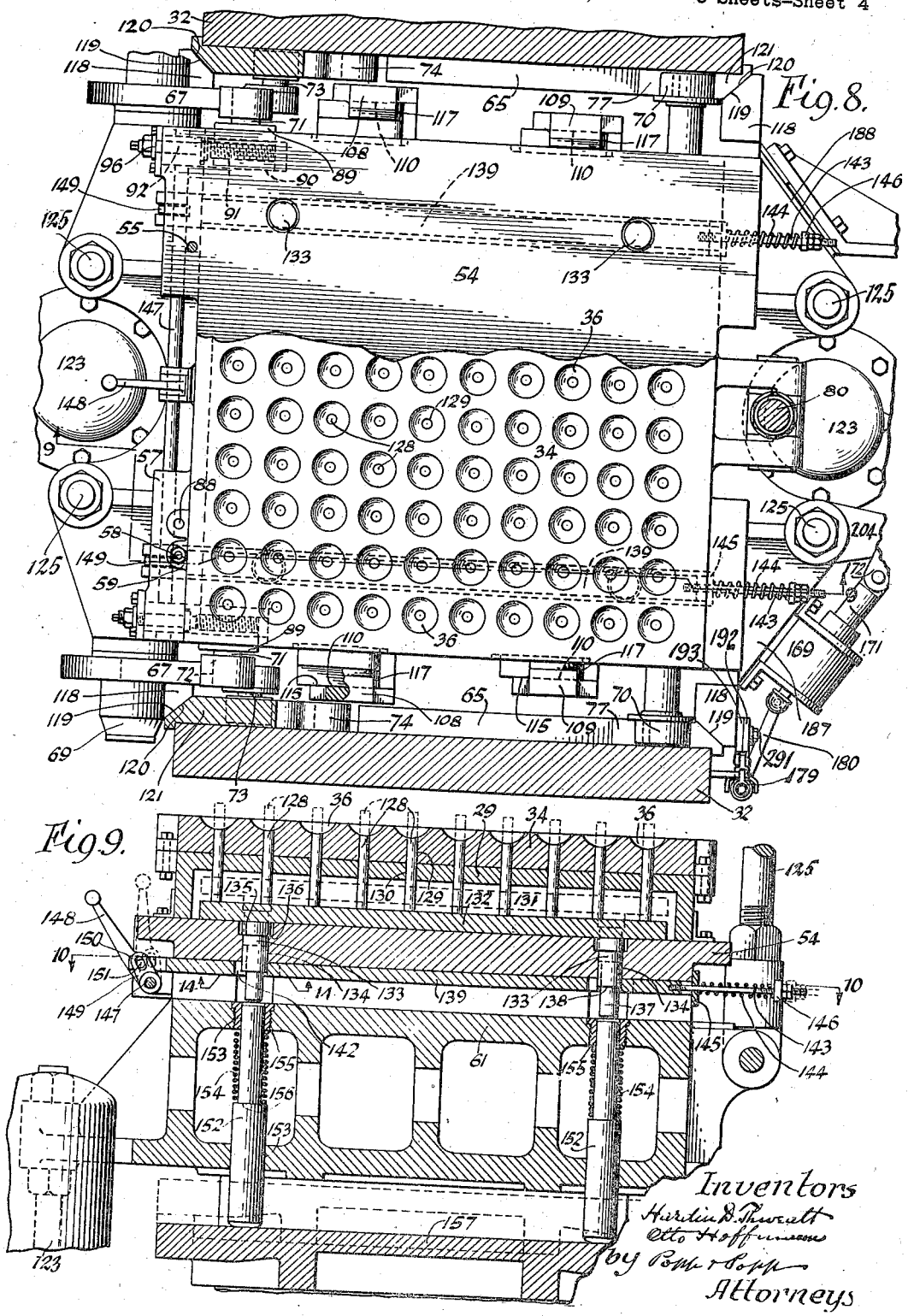

Oct. 12, 1937.  H. D. THWEATT ET AL  2,095,299
MOLDING PRESS
Filed Nov. 9, 1936  6 Sheets-Sheet 5
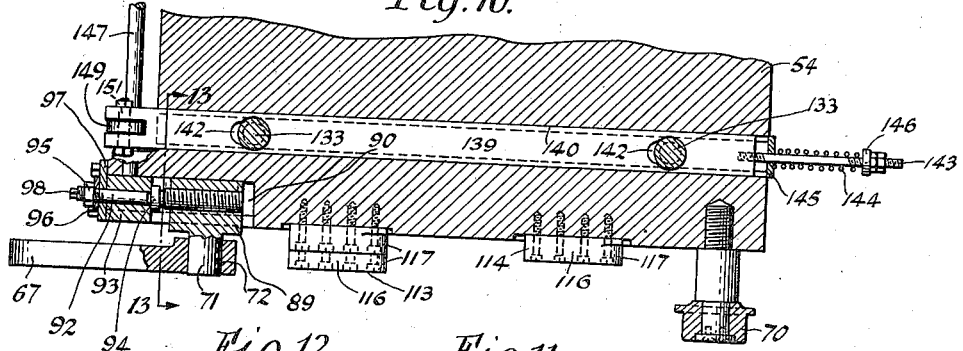
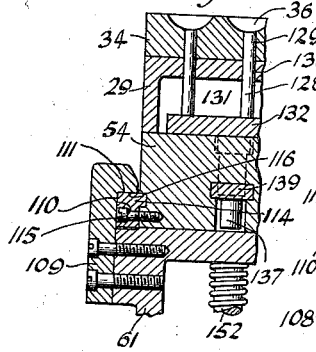
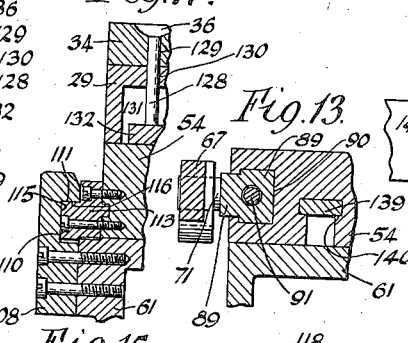
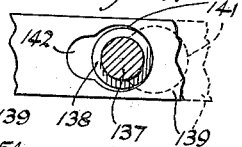
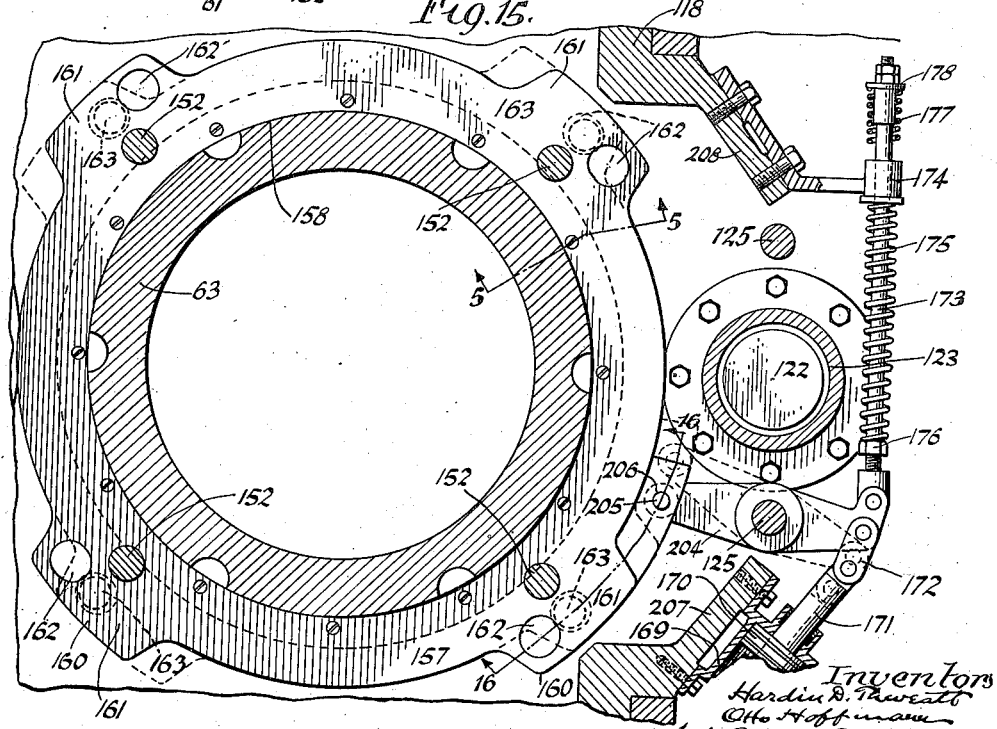

Oct. 12, 1937.  H. D. THWEATT ET AL  2,095,299
MOLDING PRESS
Filed Nov. 9, 1936  6 Sheets-Sheet 6
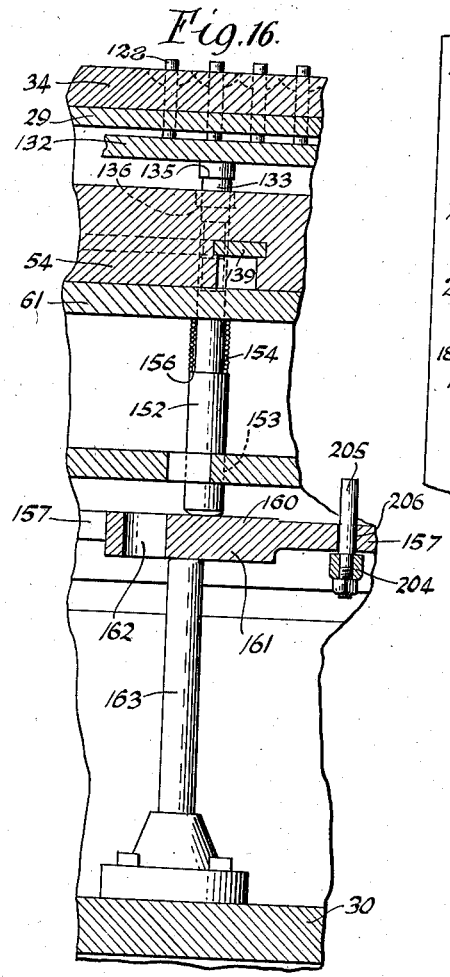
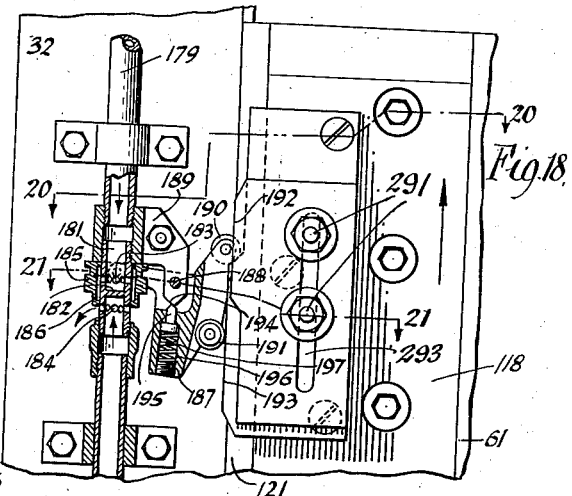

Patented Oct. 12, 1937

2,095,299

UNITED STATES PATENT OFFICE 2,095,299

MOLDING PRESS

Hardin D. Thweatt and Otto Hoffmann, Buffalo, N. Y., assignors to Lake Erie Engineering Corporation, Kenmore, N. Y., a corporation of New York Application November 9, 1936, Serial No. 109,868

14 Claims. (Cl. 18—17)

This invention relates to a molding press which is more particularly designed for subjecting articles of plastic material while in molds to hydraulic pressure for the purpose of shaping this material in accordance with the molds and compacting the same into a finished condition.

The objects of this invention are to provide a machine of this character in which the operations of opening and closing the press and effecting the stripping of the completed articles from the molds is effected solely by hydraulic actuating means; also to so operate the molds that the same can be loaded and unloaded with greater facility and convenience; also to insure greater accuracy in the operation of the press so as to obtain uniform products; and also to improve the construction of the operating mechanism in several details as will be hereinafter set forth.

In the accompanying drawings:

Fig. 1 is a front elevation of a molding press embodying these improvements and showing the parts in the position which they occupy when the molds have been moved into a position in which they are parallel and opposed but separated preparatory to effecting the final closing squeeze on the plastic articles in the molds.

Fig. 2 is a side elevation of the same.

Fig. 3 is a vertical longitudinal section of the press, on an enlarged scale, taken on line 3—3, Fig. 1, and showing the parts in the position in which the molds diverge forwardly for discharging a charge of pressed articles and receiving a charge of unpressed material.

Fig. 4 is a fragmentary rear elevation of one of the control devices for the upper mold and associated parts.

Fig. 5 is a fragmentary vertical section on an enlarged scale, taken on line 5—5, Fig. 15, and showing the means for cushioning the drop of the stripper actuating ring.

Fig. 6 is a vertical longitudinal section, on an enlarged scale, taken on line 6—6, Fig. 1.

Fig. 7 is a fragmentary vertical section, on an enlarged scale, taken on line 7—7, Fig. 6.

Fig. 8 is a horizontal section, on an enlarged scale, taken on line 8—8, Fig. 6.

Fig. 9 is a vertical longitudinal section taken on line 9—9, Fig. 8.

Fig. 10 is a fragmentary horizontal section taken on line 10—10, Fig. 9.

Figs. 11 and 12 are fragmentary vertical sections, on an enlarged scale, taken on the correspondingly numbered lines in Fig. 6.

Fig. 13 is a fragmentary vertical cross section taken on line 13—13, Fig. 10.

Fig. 14 is a fragmentary horizontal section taken on line 14—14, Fig. 9.

Fig. 15 is a horizontal section, on an enlarged scale, taken on line 15—15, Fig. 6.

Fig. 16 is a fragmentary vertical section, taken on line 16—16, Fig. 15.

Fig. 17 is a view similar to Fig. 16 but showing the parts in a different position.

Fig. 18 is a vertical section, on an enlarged scale, taken on line 18—18, Fig. 2.

Fig. 19 is a view similar to Fig. 18, but showing the parts in a different position.

Figs. 20 and 21 are fragmentary horizontal sections taken on lines 20—20, and 21—21, respectively in Fig. 18.

Fig. 22 is a fragmentary vertical section similar to Fig. 9, but showing the parts in a different position.

In the following description similar characters of reference indicate like parts in the several figures of the drawings.

The main frame or stationary part of the press which supports the movable or working parts of the same may be variously constructed, but as shown in the drawings, the same comprises a lower base 30, an upper head 31, and two upright side plates 32 connected at their upper and lower ends with opposite sides, respectively, of the base and head for the purpose of tying the same together rigidly.

Within the space between the base, head and side plates of the frame are arranged the upper and lower molds 33, 34 which preferably have the form of plates and which are provided on their respective opposing faces with complementary mold cavities 35, 36 which correspond to the shape of the articles to be molded and pressed into the desired form by the press. These molds are movably mounted on the frame so the same may be projected forwardly from the frame into a position in which the molds diverge forwardly in a vertical plane, as shown in Fig. 3, and thus render the mold cavities conveniently and easily accessible to the operator for loading unpressed plastic or other material into the mold cavities preparatory to pressing the same and also permitting the articles after the same have been finished by the co-operating pressure of the molds to be removed therefrom in like manner. After the molds have been loaded the same are retracted rearwardly so that the same are arranged between the base and head of the frame and assume a position in which the faces of two molds are horizontal and parallel with each other, as shown in Figs. 1, 2 and 6. Subsequently the upper mold remains at rest and the lower mold moves upwardly toward the upper mold for the purpose of pressing between their respective mold cavities the material therein and forming the same into the desired shape. After this pressing operation has been completed, the lower mold first descends while the upper mold is at rest so that the molds separate from one another while their faces are parallel, as shown in Figs. 1, 2 and 6, at which time the finished articles are withdrawn from the upper mold and remain in the lower mold, and then both the upper and lower molds are moved forwardly from the frame so that the upper mold inclines upwardly and the lower mold inclines downwardly, as shown in Fig. 3, thereby providing a wide opening space between the molds which enables the pressed articles to be readily removed from the lower mold cavities and to be replaced by another batch of unpressed material.

The means for supporting and guiding the upper mold during these movements are constructed as follows:—

The numeral 37 represents an upper bolster which in its operative position is arranged horizontally within the frame and bears with its upper side against the underside of the frame head 31. Below this upper bolster is arranged an upper bed or intermediate filler plate 38 which may be detachably secured thereto in any suitable manner, for example by bolts 39 connecting brackets 40, 41 arranged on the corresponding front and rear ends of the upper bolster and bed plate, as shown in Figs. 1 and 3. The upper mold 33 engages the underside of the upper bed plate and is detachably connected therewith, preferably by bolts 42 passing through lugs 43, 44 arranged respectively at the front and rear ends of the upper bed plate and upper mold, as shown in Figs. 1 and 6. This mold carrying unit comprising the upper mold, upper bolster and upper bed plate is guided on the main frame to secure the above-described movement of the upper mold by means of front and rear rollers 45, 46 pivotally mounted on the front and rear parts of opposite sides of the upper bolster and running on front and rear tracks or rails 47, 48 arranged adjacent to these rollers. Each of the front tracks or rails 47 has a downwardly curved front upper surface 49 and a horizontal rear upper surface 50 and has its rear part secured to the inner side of the adjacent frame plate 32 and its front part secured to a bracket 51 projecting forwardly from the respective frame side plate, as shown in Figs. 1, 3 and 6. Each of the rear tracks 48 is provided with a downwardly curved front upper surface 52 and a horizontal rear upper surface 53 and is secured to the inner side of the respective frame side plate 32, as shown in Fig. 3.

While the upper mold carrying unit is in its rearmost position the front and rear rollers 45, 46 engage with the horizontal rear surfaces 50, 53 of the tracks 47, 48 and hold this unit in a horizontal position and with the upper bolster in engagement with the head of the frame so that the latter forms a solid abutment for the upper mold to resist the upward thrust which is exerted against the same during the operation of pressing the articles being molded between the lower and upper molds. Upon moving the upper mold carrying unit forwardly the front rollers 45 first run off the horizontal surfaces 50 of the front track 47, thence slightly downward on the lower rear parts of the curved surfaces 49 and then upwardly on the elevated front parts of these curved surfaces, whereby the front part of the upper mold carrying unit is first moved downwardly away from the abutment formed by the upper frame head and then the front part of this unit is tipped or tilted upwardly at an angle. At the same time the rear rollers 46 first run forwardly off the horizontal track surfaces 53, thence downwardly on the rear part of the curved surfaces 52 of the rear tracks 48 and thence upwardly on the front parts of the curved surface 52, whereby the rear end of the mold carrying unit is moved away from the underside of the frame head and tipped or tilted downwardly relative thereto at the same time that the front part of the mold carrying unit is tilted upwardly relative to the frame head. During the rearward movement of the mold carrying unit the procedure is obviously reverse of that described with reference to its forward movement.

The means for supporting and guiding the lower mold during its longitiudinal or fore and aft movement are constructed as follows:—

The numeral 54 represents a lower bolster which is movable forwardly and backwardly from between the base and head of the frame and also movable vertically toward and from this head. Upon this lower bolster is mounted a lower or intermediate filler plate 29 which is detachably secured thereto by bolts 55 passing through brackets 56, 57 arranged respectively on the front and rear parts of the lower bed plate and lower bolster, as shown in Figs. 1, 3 and 6. The lower mold is detachably secured to the top of the lower bed plate by bolts 58 passing through companion lugs 59, 60 on the front and rear ends of the lower mold and lower carrying plate, as shown in Figs. 1, 3 and 6. The lower mold, lower bed plate and lower bolster together form a lower mold carrying unit which is movable into and out of a position below the upper mold unit and when this lower unit is arranged in its rearmost position the underside of the lower bolster rests on the upper side of a vertically reciprocable platen 61 whereby the lower mold unit is carried toward and from the upper mold for pressing plastic material between the mold cavities thereof and releasing the pressure on said material after the same has been formed into the desired shape. The raising of the platen is effected by a hydraulic motor which comprises a pressure cylinder 62 arranged vertically in the base of the frame and an elevating ram 63 having its lower part movable vertically in the cylinder 62 and having the platen 61 secured to the upper end thereof by bolts 64, as best shown in Fig. 3. Upon admitting fluid, such as water under pressure, to the cylinder 62 the ram 63 and the parts resting thereon will be raised and upon permitting this pressure fluid to escape from this cylinder the mold elevating ram 63 will be lowered by gravity aided in the present case by a pull back hydraulic motor as will presently appear. In the lowermost position of the elevating ram 63 the lower mold unit inclines forwardly and has its rear part overhanging the front part of the platen, as shown in Fig. 3. In this position of the lower mold unit its rear part is supported by rollers 70 pivotally mounted on opposite sides of the rear part of the lower bolster 54 and resting on the downwardly inclined front surfaces 65 of two tracks or rails 66 secured to the adjacent parts of the inner sides of the frame side plates, as shown in Fig. 3. At this time the outer part of the lower mold unit is supported by two vertically swinging shift levers arranged on opposite sides of the platen and lower mold unit and each of these levers being pivoted between its upper and lower arms 67, 68 by a horizontal transverse pin 69 on the respective side of the platen and having its upper arm operatively connected with the lower bolster by a pin 71 arranged on the front part of the respective side of the lower bolster and passing through an upright slot 72 in the upper arm of this shift lever, as shown in Fig. 6. The lower arm 68 of each of the mold shift levers is provided with a laterally projecting pin 73 which engages with a cam slot of substantially L-shape formed in a cam plate 74 secured to the adjacent side plate of the frame and having an upright dwell portion 75 and a shifting portion 76 extending rearwardly from the lower end of the dwell portion, as shown in Fig. 6.

In the fully lowered position of the elevating ram each of the shifting levers is turned so that its inner arm 68 is moved rearwardly and upwardly and its pin 73 engages with the lower shifting part 76 of the cam slot and the upper arm 67 of this lever is moved forwardly and downwardly and the lower end of its slot 72 is engaged by the adjacent front pin 71 on the corresponding side of the lower bolster whereby the latter is supported in a downwardly inclined position, as shown in Fig. 3.

During the first part of the upward movement of the elevating ram 63 the lower arms 68 of the mold shift levers are turned downwardly and forwardly by the action of the lower shifting parts 76 of the cam slots in the plates 74 and the upper arms of these levers are moved upwardly and rearwardly, thereby causing the rear part of the lower mold unit to be lifted by the rollers 70 running up the inclined surfaces 65 of the rails 66 and the front part of this mold unit to be lifted to greater extent by the shift levers. While the lower mold unit is thus lifted by the rails 66 and the shifting levers 67, 68 it is also moved bodily rearwardly until its rollers 70 engage with the horizontal rearmost upper surfaces 77 of the tracks 66 at which time the mold unit is arranged horizontally and the platen 61 has risen into engagement with the underside of the lower bolster and the dwell portions 75 of the cam slots are in engagement with the pin 73 of the shift levers, as shown in Fig. 6.

By this manner of mounting the upper and lower mold carying units a considerable tilting action is obtained during a comparatively short longitudinal movement of the same, thereby expediting the operation of the press, minimizing the space required for this operation and enabling a considerable tilting of the upper and lower molds to be obtained while the rear parts of the same still overlap the frame head and platen.

During the time that the lower mold unit is moving rearwardly into a horizontal position over the platen, the upper mold unit is simultaneously moved rearwardly into a horizontal position into engagement with the underside of the frame head, this action of the upper mold unit being effected by a shifting mechanism which derives its motion from the elevating ram 63. In its preferred form this shifting mechanism comprises a vertically sliding shifting plate 78 which is guided in vertical ways 79 on the rear side of the frame head, a link 80 connecting the lower end of this shifting plate with the rear part of the platen 61, a pair of upright cam levers 81 arranged on opposite sides of a lug 82 projecting rearwardly from the shifting plate 78 and pivoted concentrically on a horizontal pivot pin 83 mounted transversely on the rear side of the frame head, shifting rollers 84 mounted on opposite sides of the lug 82 of the sliding plate 78 and engaging with cam slots 85 in the cam levers 81, and horizontal links 86 connecting the lower ends of the cam levers 81 with the rear end of the upper bolster 37 of the upper mold unit. The timing of the movements of the several parts described is such that when the elevating ram 63 has been raised a predetermined distance short of the end of its upward stroke, the upper and lower mold units will be parallel and opposed to each other but still separated some distance which in the instant case is two and one-half inches. During the final part of the upward or squeeze movement of the elevating ram the upper and lower mold units are in parallelism and the lower mold is pressed toward the upper mold so as to compress the plastic or other material which is contained in the complementary mold cavities thereof and cause the same to conform thereto for completing the shaping of the articles under pressure.

During the last part of the upward movement of the lifting ram the lower mold unit is subjected to high pressure and forced toward the upper mold unit for taking out any slack between them and producing a final heavy squeeze on the material for completing the formation of the same. The slots 72 in the upper arms 67 of the shifting levers permit a slight play between the same and the pins 71 of the lower bolster in order to compensate for the differences in the direction of movement of these levers and the lower bolster upon moving the latter inwardly and outwardly relative to the main ram.

Centering means are provided for the purpose of compelling the lower and upper molds to come together with the complementary mold cavities thereof in exact register. To accomplish this result the upper mold is provided on its front and rear sides with downwardly projecting centering dowel pins 87 which enter eyes 88 on the front and rear ends of the lower mold during the last part of the upward movement of the elevating ram thus ensuring exact alinement of the mold cavities and production of perfectly formed articles.

When first setting up the press the complementary cavities of the upper and lower molds may not be in exact register in a direction fore and aft of the press and for this reason a vernier or fine adjustment means are provided to secure accurate longitudinal alinement of the lower mold relative to the upper. The preferred means for this purpose, best shown in Figs. 1, 8, 10 and 13, are constructed as follows:—

The numeral 89 represents two adjusting blocks arranged on opposite sides of the front part of the lower bolster 54, each of these blocks carrying one of the shifting pins 71 and guided for horizontal movement on this bolster by making the same T-shaped in cross section and arranging the head of the T in the rear part of a correspondingly shaped guideway 90 formed lengthwise in the adjacent part of the lower bolster 54, as shown in Fig. 13, thereby preventing this block and bolster from moving in any direction relative to each other excepting in a direction lengthwise of the guideway 90.

Each of the adjusting blocks is associated with a longitudinal adjusting screw having a rear threaded shank 91 which works in a threaded opening in the respective block, a front unthreaded stem 92 which turns in a thrust block 93 mounted in the front part of the guideway 90 on the adjacent part of the lower bolster 54, a collar or shoulder 94 adapted to engage with the rear side of the thrust block 93, a screw nut 95 working on the threaded front end of the stem 92, and a washer 96 interposed between the rear side of the nut 95 and the front side of a thrust plate 97 secured to the adjacent front part of the lower bolster and engaging with the front side of the thrust block 93. Upon backing the nut 95 away from the washer 96 and turning the adjusting screw so that its collar 94 pushes forwardly on the block 93 then the lower bolster will be moved forwardly relative to the pivot 71 of the respective shifting lever 67, 68 and upon turning this adjusting screw in the opposite direction the nut 95 will press against the front side of the abutment plate 97 through the medium of the interposed washer 96 and move the lower bolster rearwardly, after which this nut may be again tightened on the stem of this screw for holding the parts in their adjusted relation in which the cavities of both molds are in correct alinement. The turning of this adjusting screw may be effected by applying a wrench to the squared front end 98 of this screw.

Means are provided for firmly holding the upper and lower mold units on the frame head and platen and locking or retaining these parts securely against lateral displacement relative to each other in order to attain the maximum perfection in the articles which are produced. These means, which are best shown in Figs. 3, 6, 7, 11 and 12, are constructed as follows:—

Projecting downwardly from the underside of the frame head 31 adjacent to opposite sides of the upper bolster 37 are front and rear locking or retaining brackets 99 each of which is provided with an inner vertical longitudinal retaining surface 100, and an upper horizontal retaining surface 101 arranged at the lower end of the vertical surface 100 and having a rounded or curved front end 102. On opposite longitudinal sides of the upper bolster the same is provided with front and rear locking or retaining shoes 103 each of which has an outer vertical longitudinal retaining surface 104, and a lower longitudinal retaining surface 105 which is rounded or curved at its rear end 106. When the upper mold unit is in its foremost position shown in Fig. 3, the retaining shoes of the upper bolster are out of engagement from the upper retaining brackets 99 but during the last part of the rearward movement of the upper mold unit each of the retaining shoes of the upper bolster engages its vertical and horizontal retaining surfaces 104, 105 with the corresponding vertical and horizontal retaining surfaces 100, 101 of the companion bracket 99 on the frame head, thereby locking the upper mold unit securely to the frame head so that the upper mold is held rigidly in place and will not become displaced during the pressing operation. The co-operating horizontal surfaces of the upper retaining brackets and shoes are guided vertically relative to one another by engagement of the rounded ends 102 and 106 on the upper retaining brackets and shoes.

Projecting upwardly from opposite side of the platen 61 are front and rear locking or retaining brackets 108, 109 each of which is provided with an upright longitudinal inner retaining surface 110 and a lower horizontal longitudinal retaining surface 111 which extends inwardly from the upper end of the vertical surface 110, as best shown in Figs. 11 and 12. Each of the horizontal retaining surfaces is provided with a rounded front end 112, as shown in Fig. 6. Projecting from opposite sides of the lower bolster 54 are front and rear retaining or locking shoes 113, 114 each of which has a vertical outer longitudinal surface 115 and an upper horizontal longitudinal surface 116 extending inwardly from the upper end of this vertical surface. When the lower mold unit is in foremost position, as shown in Fig. 3, the locking or retaining shoes of the lower bolster are out of engagement with the lower locking or retaining brackets 108, 109 of the platen, but during the last part of the backward movement of the lower mold unit the horizontal and vertical faces of the front and rear locking shoes 113, 114 engage the corresponding faces of the front and rear locking brackets, 108, 109, respectively, and thereby rigidly lock the lower mold unit against displacement relative to each other during the operation of the press. Vertical guiding of the horizontal co-operating surfaces of the lower locking shoes and brackets is effected by co-operation of rounded surfaces 117 on the rear ends of these shoes with the rounded surfaces 112 at the front ends of the brackets, as shown in Fig. 6.

In the closing operation of the press the platen effects the first part of its rising movement while the lower mold unit is moved rearwardly over the platen. During this operation the rear locking shoes 114 of the lower bolster must first pass the front locking brackets 108 of the platen and thereafter interlock with the rear brackets 109 of the platen at the same time that the front locking shoes 113 of the lower bolster interlock with the front locking brackets of the platen. To permit of this relative movement of these parts without conflicting with one another, the front brackets 108 are arranged farther away from the sides of the lower bolster than the rear brackets 109, and the front shoes 113 are made comparatively wide while the rear shoes 114 are made relatively narrow, as shown in Figs. 11 and 12. By this means the narrow rear shoes 114 are able to first pass rearwardly between the widely spaced front brackets 108 and then interlock with the narrowly spaced rear brackets 109 at the same time that the wide front shoes 113 are interlocked with the widely spaced front brackets, and thus avoid interference between any of the moving parts.

Instead of depending solely on the sliding action of the lifting or elevating ram 63 in the cylinder 62 as part of the means for guiding the platen in its vertical movement, greater accuracy in the control of the platen is obtained by additionally guiding the same by means of vertical runners 118 arranged on the corners of the platen and having bevelled faces 119 which engage with the bevelled faces 120 of upright guide rails 121 mounted on the adjacent inner parts of the frame sides, as shown in Figs. 1, 8 and 20.

After the platen has completed its upward stroke and the pressing of the materials between the molds has been finished the downward or opening movement of the platen and the parts operatively associated is effected by power which is derived from a hydraulic pull-back motor which is preferably organized as follows:—

The numeral 122 represents two upright hydraulic pull-back rams arranged in front and in rear of the frame base and each passing through the lower end of and movable vertically in a hydraulic pull-back cylinder 123 mounted on the adjacent upper part of the frame base, as best shown in Figs. 1, 3, 6, 8 and 15. The lower end of each pull-back ram is connected with a horizontal transverse cross bar 124 the opposite ends of which are connected with the lower ends of two pull rods 125 arranged vertically on opposite sides of the respective pull-back cylinder 123. The upper ends of the pull-back rods associated with each pull-back ram are connected with a bracket 126 on the adjacent part of the platen and between the upper and lower ends of these rods the same are guided in brackets 127 on the adjacent upper part of the frame base, as shown in Figs. 1, 2 and 6. Upon admitting a pressure medium, such as water under pressure, to the upper ends of the pull-back cylinders the rams therein will be forced downwardly together with the platen connected therewith, and upon discharging this pressure fluid from the pull-back cylinders the rams therein are free to be raised by the upward working stroke of the elevating or lifting ram.

After the articles have been completely formed by compression of the material between the mold cavities of the two molds these articles remain in the cavities 36 of the lower mold during the initial part of the downward or opening movement of the latter. Immediately after the platen and the lower mold unit have effected the first part of their downward movement and before this mold unit begins its forward movement and is inclined forwardly, the formed articles in the cavities of the lower mold are ejected or stripped therefrom to facilitate their removal from this mold preparatory to replacing the finished articles with unfinished material. For this purpose automatically actuated stripper means are provided which are constructed as follows and best shown in Figs. 3, 8, 9, and 10—22:—

The numeral 128 represents a plurality of upright stripper pins each of which is movable vertically in a guideway formed partly by an opening 129 in the lower mold and partly by an opening 130 in the upper part of the lower bed plate or filler plate 29. Each of these stripper pins is arranged in line with one of the cavities 36 in the lower mold and has its lower end arranged in a lifting chamber 131 formed in the underside of the bed 29. The upper end of each stripper pin is adapted to be lowered into a position in which it is flush with the bottom of the respective mold cavity 36 when the same is empty and ready to be filled with unfinished material, as shown in Fig. 3, and the upper end of this pin is also flush with the bottom of the respective mold cavity during the operation of pressing the material so that it conforms to the shape of the respective mold cavity. After the compression of the material into the desired shape between the cavities of the upper and lower molds has been completed and the lower mold has effected the first part of its downward movement the several stripper pins are raised so that the upper end of each of these pins projects above the bottom of the respective mold cavity, as shown by dotted lines in Fig. 9, thereby lifting or ejecting the molded articles from the lower mold cavities and permitting the same to be readily removed from the lower mold. Simultaneous raising of the several stripper pins is effected by a stripper plate 132 arranged horizontally in the lifting chamber 131 below the lower ends of the pins 128. When the stripper plate is in its lowermost position it rests on the upper side of the lower bolster 54 which forms the bottom of the lifting chamber 131, as shown by full lines in Fig. 9, and upon raising the stripper plate, as shown by dotted lines in the same figure, the same will raise all of the stripper pins and eject the pressed articles from the lowermost cavities 36. The numeral 133 represents a plurality of stripper locking pins, preferably four in number slidable vertically in guide openings 134 formed in the lower bolster 54 adjacent to the corners thereof and underneath the stripper plate 132. When these locking pins are in their lowermost position the upper ends of the same are preferably flush with the top of the lower bolster and their downward movement is limited by a stop shoulder 135 arranged on the upper part of each locking pin and engaging a corresponding stop shoulder 136 in the bore of the respective guide opening 134, as shown in Figs. 9 and 22. On the lower part of each locking pin 133 the same is provided with a reduced part 137 forming a downwardly facing shoulder 138 thereon between this lower reduced part and the upper larger part of this pin. Upon pushing the locking pins upwardly, the same raise the stripper plate 132 and the latter in turn raise the stripper pins for ejecting the pressed articles. Locking means are provided for automatically holding the locking pins in an elevated position after the same have been raised and manually releasing the same so as to again permit their descent. These locking means include two longitudinally movable locking bars 139 guided in longitudinal horizontal guideways 140 on the lower bolster adjacent to opposite sides of the same. Each of these locking bars is provided with two key-hole openings which receive the lower parts of two of the locking pins, each of these openings having a wide rear part 141 and a narrow front part 142, as best shown in Fig. 14.

In the lowered position of the locking pins the large part of each pin engages with the large part 141 of one of the locking openings in one of the locking bars and each of the latter presses the front sides of the large parts of said openings against the front sides of the large parts of said locking pins by means of a tension device consisting of a tension rod 143 projecting rearwardly from each locking bar and a spring 144 surrounding each tension rod and bearing at its front end against an abutment plate 145 on the rear side of the lower bolster while its rear end bears against a collar 146 on the rear end of said rod, as best shown in Figs. 9 and 10. The instant the locking pins are raised to a position in which their locking shoulders 138 are above the locking bars 139 then the latter are moved rearward quickly by the springs 144 so as to engage the narrow front part 142 of each locking opening in these bars with the small lower part 137 of the respective locking pin so that the locking shoulder 138 of each of these pins overhangs the adjacent upper side of the respective locking bar and engages therewith, thereby holding each locking pin in its elevated position, as shown in Fig. 22, together with the parts supported thereon. When it is desired to release the locking pins and permit the same to descend together with the parts supported thereby this may be accomplished manually in various ways for example by the means which are shown in Figs. 1, 3, 8, 9 and 10, and which comprise a horizontal rock shaft 147 journaled transversely in bearings on the front part of the lower bolster and provided centrally with an upwardly projecting operating handle 148, and two rock arms 149 projecting upwardly from opposite ends of the rock shaft and each provided with a slot 150 which receives a transverse pin 151 on the front end of one of the locking bars. Upon moving the handle forwardly by hand the shaft 147 and its arms will be turned in direction for moving the locking bars forwardly and disengaging the narrow parts 142 of the key-hole openings from the small parts of the locking pins and also moving forwardly the upwardly facing surfaces of these bars around the narrow parts of these key-hole openings from underneath the locking shoulders 138 of the locking pins whereby the latter are permitted to descend by passing with their large upper parts 133 through the wide rear parts 141 of the key-hole openings as shown in Figs. 9 and 14.

The numeral 152 represents a plurality of upright trip pins which are guided for vertical movement in guideways 153 on the platen and each of which has its upper end arranged below the lower end of one of the locking pins and is yieldingly held in a depressed position by a spring 154 surrounding this pin and bearing at its upper and lower ends against a shoulder 155 on the upper part of the platen and a shoulder 156 on the intermediate part of this pin, as shown in Fig. 9. The lower ends of the several trip pins engage with the upper side of a trip or releasing ring 157 at different points circumferentially thereof. This trip ring surrounds the upper reduced cylindrical part 158 of the hydraulic elevating ram 63 and is capable of reciprocating vertical thereon and also oscillating horizontal relatively thereto about the axis of the elevating ram. Downward movement of the trip ring is limited by engagement of its underside with an annular upwardly facing shoulder 159 formed on the exterior of the elevating ram at the lower end of its reduced part 158, as shown in Figs. 3 and 5.

At equidistant points about the periphery of the trip ring the latter is provided with laterally projecting abutment lugs 160, preferably four in number each of which has a solid part 161 and a perforation 162 on one side of the solid part, as shown in Figs. 15, 16 and 17. The numeral 163 represents a plurality of upright thrust rods arranged in a circumferential row around the elevating ram and each mounted at its lower end on the upper part of the frame base so that it is stationary while the upper end of this rod terminates adajacent to one of the thrust lugs 160 of the trip ring.

When the press is closed and the lower mold unit is in its highest position the trip ring 157 is elevated and also turned so that the solid parts 161 of its thrust lugs engage with the upper ends of the thrust rods 163, as shown in Fig. 16 and at the same time each locking pin 133 and its companion trip pin 152 form a column which is interposed between the underside of the stripping plate 132 and the upper side of the trip ring, which column however has a slight gap between the lower end of the respective locking pin 133 and the upper end of the trip pin associated therewith, as shown in Fig. 9.

During the initial part of the downward movement of the lower mold unit the slack between the downwardly moving stripper pins 128 and the relatively stationary trip pins 152 is taken up and immediately following this initial downward movement of the lower mold unit the stripper pins are held against downward movement due to the stripper plate, locking pins, trip pins, trip ring and thrust rods forming a solid support for the stripper pins on the stationary press frame. The mold unit now continues its downward movement independently of the stripper pins whereby the latter are pushed upwardly into the cavities 36 of the lower mold and dislodge therefrom the molded articles contained therein preparatory to being completely removed by the attendant either by hand, a rake or other tool best suited for this purpose.

Immediately after the finished articles are discharged from the cavities of the lower mold and while the latter in its descent is still in a horizontal position the trip pins 152 are quickly permitted to descend so that their upper ends do not project above the platen and therefore can not interfere with the free forward movement of the lower mold unit for unlocking the same from the platen and the downward tilting of this unit to facilitate the removal of the finished articles from the lower mold and the introduction of new unformed material.

This quick withdrawal of the trip pins from the locking pins is effected by suddenly turning the trip ring about the axis of the elevating ram immediately after the ejecting operation of the stripper pins so that the clearance holes 162 of the thrust lugs 160 are in line with the stationary thrust rod 163 and when this occurs the trip ring drops by gravity with its clearance or release openings 162 sliding downwardly over the thrust rods 163, as shown in Fig. 17, thereby permitting the trip pins to be withdrawn from engagement with the locking pins before the lower mold unit begins its forward movement. The downward movement of the trip ring on the elevating ram is limited by engagement of this ring with the stop shoulder 159 on this rim. In order to prevent undue noise and wear on the parts when the trip ring drops cushioning means are provided to absorb the shock, which means preferably comprise a plurality of cushioning pins 164 arranged vertically in pockets 165 at different points in the trip ring and each yieldingly held in a position in which the same normally projects with its lower end below the trip ring. For this purpose a spring 166 in each pocket 165 presses downwardly on the cushioning pin therein and the downward movement of the cushioning pin in this pocket is limited by co-operating shoulders 167, 168 formed on this pin and the inside of this pocket, as shown in Fig. 5. When the trip ring descends the cushioning pins engage the shoulder 159 of the elevating ram first and this absorbs the shock and minimizes noise and wear.

After the lower molding unit has reached its lowermost position in which it inclines forwardly from the platen the operator removes the finished articles and pulls on the handle 148 so as to release the locking bars 139 from the locking pins and permit the stripper pins and stripper plate to drop into their inoperative position. Means are provided for automatically turning the trip ring in one direction for disengaging the trip pins from the locking pins before the lower mold unit begins its forward movement relative to the platen which also turns the trip ring in the opposite direction when the latter is elevated above the thrust rod for bringing the solid parts 161 of this ring over the thrust rod and holding this ring temporarily against downward movement for the purpose hereinbefore described. The preferred means for accomplishing this result are shown in Figs. 1, 2, 6, 8, 15-21 and are constructed as follows:—

The numeral 204 represents a rocking shift lever which moves bodily up and down with the platen and also turns horizontally relative thereto this being accomplished by pivoting this lever on the adjacent pull rod 125 connected with the rear side of the platen. On its front arm the rock lever 204 is provided with a vertical coupling pin 205 which slidingly engages an opening formed in a part of the trip ring 157, 186 as shown in Figs. 15, 16 and 17. This shift lever is rocked by actuating means which are mounted on brackets 207, 208 on the rear part of the platen so as to move vertically with the latter which actuating means include a pneumatic motor having a horizontal air cylinder 169 mounted on the bracket 207 and a piston 170 sliding in this cylinder and having its piston rod 171 connected by a link 172 with the outer arm of the shift lever 204. Air under pressure is admitted to the outer end of the cylinder 169 for turning the shift lever 204 in the direction which will turn the trip ring 157 so that each of its solid parts 161 is arranged over the upper end of one of the thrust pins 163 as shown by full lines in Figs. 15 and 16 thereby preventing the trip ring from dropping. Upon exhausting the air pressure from the outer end of the cylinder this lever 204 will be turned in the opposite direction by spring return means so that the trip ring 157 will be turned in the opposite direction and bring each of each release openings 162 over one of the thrust pins 163 and thereby permit the thrust ring to drop for the purpose previously explained.

These spring return means, as shown in Fig. 15 comprise a push rod 173 connected at one end with the outer arm of the shift lever 204 and passing through a guide eye 174 on the bracket 208, and a spring 175 surrounding this rod and bearing at one end against this guide eye and at its opposite end against a shoulder 176, which is formed by a screw nut on said rod. The instant the air pressure in the outer end of the cylinder 169 is released, the resilience of the spring 175 moves the piston 170 backwardly and also turns the trip ring 157 so that its holes 162 are in alinement with the thrust rods 163 and therefore permit this ring to drop and the stripper pins to retract into their depressed inoperative position relative to the cavities in the lower mold. For the purpose of avoiding undue noise, wear and jarring of the press during the sudden return action of the trip ring under the pressure of the spring 175 cushioning means are provided consisting preferably of a cushion spring 177 surrounding the return rod 173 and bearing at its outer end against an abutment 178 on this rod while its inner end is adapted to engage with the outer side of the guide eye 174, as shown in Fig. 15.

Compressed air for operating the piston 170 is supplied by a pipe or tube 179 from any suitable source to the front or outer end of the cylinder and the admission of this compressed air to this cylinder and the discharge of the spent air therefrom is controlled by a valve mechanism which operates automatically in harmony with the movements of the press platen. A satisfactory form of air controlling valve mechanism for this purpose is shown in Figs. 1, 2, 6, 8, 16, 18, 19, 20 and 21, and is constructed as follows:—

The compressed air supply conduit preferably consists of a stationary section mounted on one of the frame sides 32 and a flexible section 180 in order to permit the air cylinder 169 to rise and fall with the platen. The fixed part 179 of the air supply pipe includes a valve device whereby compressed air may either be supplied to the cylinder 169 or this air supply may be shut off and this cylinder vented to the atmosphere to permit the spent air to escape. This valve device comprises a tubular body 181 connected at its opposite ends with sections of the pipe 179 and provided with a partition 182 and upper inlet ports 183 and lower outlet ports 184 arranged above and below said partition, and a sleeve 185 slidable lengthwise on the exterior side of the valve body and having an interior cavity 186. Upon moving this sleeve into its lowermost position its cavity 186 will place the upper and lower ports 183, 184 in communication as shown in Fig. 19 and permit compressed air to pass to the front end of the cylinder 169 for moving the solid parts 161 of the trip ring over the thrust rods 163, and upon moving this valve sleeve downwardly into its uppermost position, as shown in Fig. 18, the lower outlet ports 184 will be cut off from the compressed inlet ports 183 and connected with the atmosphere so that the spent air can escape from the cylinder 169 and permit the spring 175 to turn the trip ring 157 into a position which will permit the stripper pins to drop. The shifting of the air control valve sleeve 186 from one extreme position to the other is effected quickly by a trip device which is actuated by motion derived from the vertically reciprocating platen, this trip device being constructed as follows and best shown in Figs. 18-21:—

The numeral 187 represents a vertically swinging tappet or trip lever pivoted on a pin 188 carried by a stationary bracket 189 on the air supply pipe 179 having its outer arm connected with the valve sleeve 186 and its inner arm provided with upper and lower trip rollers 190, 191 which are arranged above and below, respectively, of the axis of the pivot pin 188. On the adjacent part of the platen two cam shaped tappets 192, 193, are mounted to move vertically therewith, the upper tappet 192 being adapted to engage the lower trip roller 191 and the lower tappet 193 being adapted to engage the upper trip roller 190.

The lower tappet 193 is preferably fixed on the platen 61 but the upper tappet 192 is made adjustable thereon to suit the character of the molds which are used and the articles to be formed and this adjustment is preferably effected by means of clamping bolts 291 mounted on the platen and passing through a vertical slot 293 in the upper tappet, as shown in Figs. 18, 19 and 21.

During the downward movement of the platen 61 the lower tappet 193 engages the upper roller 190 and turns the tappet lever 187 in the direction for operating the valve sleeve 186 so as to supply air to the shift cylinder 169, as shown in Fig. 19, and during the upward movement of the platen the upper tappet 192 by engaging the lower tappet roller 191 turns the tappet lever 187 in the direction for shifting the valve sleeve 186 so the same cuts off the compressed air supply to the cylinder 169 and vents the latter to the atmosphere for permitting the spring 175 to turn the ring 157 into a position in which the openings 162 are in alinement with the thrust rods 163 and thus permit the stripper pins to retract from the lower mold cavities during the descent of the lower mold. This air valve trip mechanism is so organized that the air pressure is on the piston 170 during the latter part of the upward stroke of the platen and also the initial downward stroke of the same until the elevating ram has nearly reached that position in its descent when the upper and lower molds begin their forwardly tilting movement. The upward movement of the trip ring 157 is effected by engagement of the shoulder 159 of the elevating ram with this ring as this ram rises and during the greater part of the upward movement of the elevating ram the trip ring slides with its holes 162 upwardly on the thrust rods 163. When however the trip ring has been raised above the upper ends of the thrust rod then the trip ring is released and quickly turned by the air pressure against the piston 170 for bringing its solid parts 161 over the thrust rods.

After the trip ring has been carried above the thrust rods and has been turned over the same the trip ring continues its upward movement with the platen to complete the closure of the press but after the platen has effected the initial part of its downward movement the trip ring is held against downward movement for a time by the thrust rods so that the stripper pins will discharge the articles in the lower mold cavities. The coupling pin 165 is made sufficiently long to permit this independent movement of the platen which carries the shift lever 204 and the trip ring 157 which has a limited sliding movement on the elevating ram, as shown in Figs. 16 and 17.

In order to cause the trip lever 189 to be moved quickly in both directions, accelerating means are employed which preferably consists of a V-shaped snap cam 194 arranged on the bracket 189 and a plunger 195 slidable lengthwise in a pocket 196 on the trip lever 187 and held yieldingly in engagement with this snap cam by a spring 197 arranged in the pocket 196 and bearing against said plunger. During the upward movement of the platen the same turns the valve trip lever 187 from the position shown in Fig. 18 to the position shown in Fig. 19 and during the first part of this movement of the platen the lower tappet 193, by engaging the upper tappet roller 190, first turns the tappet lever 187 slowly in an anti-clockwise direction. As the plunger 195 approaches the high or salient part of the snap cam 194 the tension on the spring 197 is increased so that when the plunger passes over the highest part of this cam the opposite inclined surface of the latter by reaction thereon of the spring pressed plunger 195, will cause the throw of the trip lever 187 in the direction of the arrow to be completed, as shown in Fig. 19, with a quick action. Turning of the tappet lever from the position shown in Fig. 19 to that shown in Fig. 18 is effected in the same manner as the upper tappet 192 by engaging the lower tappet roller 191 so that it first turns the tappet lever 187 slowly in a clockwise direction and causes the plunger 195, by riding toward the high part of the snap cam from right to left, to press back the plunger and increase the tension on the spring 197, and when the plunger has passed the high part of this cam the reaction of the spring pressed plunger against the left hand incline of this cam causes the turning of this lever in a clockwise direction to be completed quickly.

The cylinders of the pull-back rams are constantly under high pressure so that they will descend promptly when the upward pressure on the elevating ram is cut off, but when high pressure is applied to the elevating ram the larger area of the same causes it to rise and owing to its preponderance over the area of the pull-back rams will prevent any retarding effect by the latter. In the operation of the press the first part of the upward movement of the elevating ram is effected comparatively fast and at a relatively low pressure but the final part of this upward movement is effected slowly and under a heavy pressure, so as to properly form the articles between the molds.

Each of the locking pins 133 and its companion shifting pin 152 in effect form the upper and lower sections of a shifting member for transmitting the action of the trip or ejecting ring 157 to the stripper pins but division of each of these shifting members into sections as shown is necessary in order to permit that part of the stripper mechanism on the lower mold unit to move forward off the platen while the latter remains behind on the lifting ram.

By employing a spring 175 to move the trip ring 157 in a direction opposite to the effect on this ring of the pneumatic motor piston 171, safety against injuring the press is assured in the event that the molds are operated when the compressed air for the pneumatic motor fails, because the spring 175 under such circumstances would hold the trip ring 157 in a position to present its clearance holes 162 over thrust pins 163 and thus permit this ring to descend with the platen, otherwise the intermediate shifting pins 152 would be left in a position in which the same project above the platen and therefore would be sheared off by the bolster of the lower mold unit as the latter moves forwardly off the platen and into an inclined position for discharging the finished product and taking on new material.

Any suitable valve mechanism may be employed for controlling the action of the pressure fluid on the mold lifting ram 63 and the pull-back rams 122, that shown generally at 300 in Fig. 1 being organized to maintain a high pressure on the pull-back rams at all times, a low pressure on the mold lifting ram during the main part of the upward movement of the latter for rapidly closing the molds and a high pressure on the lifting ram for the purpose of producing a final heavy squeeze on the material between the molds and producing finished articles therefrom. Although the pressure is on the pull-back rams at the same time that it is on the lifting rams, the latter nevertheless are ineffective during the upward movement of the lifting ram and rise with the latter because the area of the lifting ram is considerably greater than that of the pull-back rams, but when the pressure is cut off from the lifting ram the constant pressure on the pull-back rams causes the latter to be immediately lowered and the press to be opened.

We claim as our invention:—

1. A molding press comprising a frame, upper and lower cooperating mold units arranged within said frame, means for moving said upper unit into an operative position parallel with the lower unit and into a laterally inclined inoperative position including downwardly curved tracks arranged on the frame, and supporting members arranged on the upper mold unit and running on said tracks, and means for moving said lower mold unit toward and from the upper mold unit including a shifting lever pivoted on the frame and connected with said upper unit and provided with a cam slot, and a vertically movable slide having a pin working in said cam slot.

2. A molding press comprising a frame, upper and lower cooperating mold units arranged within said frame, means for moving said upper unit into an operative position parallel with the lower unit and into a laterally inclined inoperative position including downwardly curved tracks arranged on the frame, and supporting members arranged on the upper mold unit and running on said tracks, means for moving said lower mold unit toward and from the upper mold unit, and means for interlocking the upper mold unit with said frame in its operative position.

3. A molding press comprising a frame, upper and lower cooperating mold units arranged within said frame, means for moving said upper unit into an operative position parallel with the lower unit and into a laterally inclined inoperative position including downwardly curved tracks arranged on the frame, and supporting members arranged on the upper mold unit and running on said tracks, means for moving said lower mold unit toward and from the upper mold unit, and means for interlocking the upper mold unit with said frame in its operative position, including brackets arranged on the frame and having vertical and horizontal guiding surfaces, and shoes mounted on the upper mold unit and having vertical and horizontal guiding surfaces adapted to engage with corresponding surfaces of said brackets.

4. A molding press comprising a frame, upper and lower cooperating mold units, means for moving said upper unit into a horizontally operative position and also into an inclined inoperative position relative to said frame, including upper tracks mounted on the frame and supporting members on the upper mold unit running on said upper tracks, means for moving said lower unit in an operative position toward and from the upper unit and also into a laterally inclined inoperative position including lower tracks mounted on the frame, lower supporting members on the lower unit running on said lower tracks, a vertically movable platen carrying said lower mold unit, means for interlocking said upper mold unit with the frame including upper front and rear brackets mounted on the front and rear parts of said frame and upper front and rear shoes arranged on the front and rear parts of the upper mold unit and adapted to interlock with said front and rear brackets, respectively; and means for interlocking the lower mold unit with the platen including lower front and rear brackets arranged on the front and rear parts of the platen, and lower front and rear shoes arranged on the front and rear parts of the lower mold unit and adapted to interlock with the lower front and rear brackets, respectively, the companion front brackets and shoes between the front parts of the mold units and the frame and platen being spaced farther apart than the companion brackets and shoes between the rear parts of the mold units and the frame and platen.

5. A molding press including a molding unit having a mold cavity, a stripper pin movably mounted on said mold unit and adapted to eject the article from said cavity after the same has been formed therein, and locking means for holding said pin in its projected position relative to said mold cavity, said locking means including a locking pin guided on the mold unit and adapted to lift said stripper pin, means for lifting said locking pin, and a locking device on said mold unit for holding said locking pin in its elevated position.

6. A molding press including a molding unit having a mold cavity, a stripper pin movably mounted on said mold unit and adapted to eject the article from said cavity after the same has been formed therein, and locking means for holding said pin in its projected position relative to said mold cavity, said locking means including a locking pin guided on the mold unit and adapted to lift said stripper pin and having a locking shoulder, means for lifting said locking pin, and a locking bar slidable on said mold unit and having a locking shoulder adapted to be engaged with the shoulder of said locking pin for holding the latter in its elevated position and to be disengaged from the shoulder of said locking pin to permit the latter to descend.

7. A molding press including a molding unit having a mold cavity, a stripper pin movably mounted on said mold unit and adapted to eject the article from said cavity after the same has been formed therein, and locking means for holding said pin in its projected position relative to said mold cavity, said locking means including a locking pin guided on the mold unit and adapted to lift said stripper pin and having a locking shoulder, means for lifting said locking pin, a locking bar slidable on said mold unit and having a locking shoulder adapted to be engaged with the shoulder of said locking pin for holding the latter in its elevated position and to be disengaged from the shoulder of said locking pin to permit the latter to descend, spring means for moving said locking bar in the direction for locking said locking pin in an elevated position, and manually operated means for moving the locking bar in the direction for releasing said locking pin and permitting the same to descend.

8. A molding press comprising upper and lower mold units provided in their opposing faces with cooperating mold forms, means for moving the lower mold unit toward and from the upper mold unit including a vertically movable platen upon which said lower mold unit is mounted, stripper pins movably mounted on the lower mold unit and adapted to engage the articles from the forms of said lower mold unit, locking means for holding said stripper pins in an elevated position, and thrust means which are relatively stationary and which during the downward movement of said platen and lower mold unit operate to project the stripper pins into the forms of said lower mold unit and eject the articles from the forms thereon.

9. A molding press comprising upper and lower mold units provided in their opposing faces with cooperating mold forms, means for moving the lower mold unit toward and from the upper mold unit including a vertically movable platen upon which said lower mold unit is mounted, stripper pins movably mounted on the lower mold unit and adapted to engage the articles from the forms of said lower mold unit, locking means for holding said stripper pins in an elevated position, and thrust means which are relatively stationary and which during the downward movement of said platen and lower mold unit operate to project the stripper pins into the forms of said lower mold unit and eject the articles from the forms thereon, said thrust means including shifting pins guided for vertical movement on said platen and engaging the lower ends of said locking pins, stationary upright thrust members, and an intermediate releasing member engaging with the lower ends of said shifting pins and movable vertically for lifting the shifting pins and also movable horizontally for bringing the releasing member over said thrust members and arresting its downward movement or clearing said thrust members and permitting said releasing member to descend.

10. A molding press comprising a frame, an upper mold unit adapted to be supported stationarily on the upper part of said frame, a lower mold unit movable toward and from the upper mold unit, a vertically movable platen on which said lower mold unit is mounted, a hydraulic motor having a vertically movable ram which carries said platen and which has an upwardly facing shoulder, stripper pins movable vertically on said lower mold unit and adapted to eject the formed articles from the lower mold unit, shifting pins slidable vertically on said platen and operating on said stripper pins to lift the same, stationary thrust pins arranged around said ram below said shifting pins, and a trip ring surrounding said ram and adapted to be engaged by the shoulder thereof for raising said ring and the latter engaging with the lower end of said shifting pins, and operating means for turning said trip ring either into a position in which the same engages its underside with the upper ends of said thrust pins or into a position in which said trip ring clears said thrust pins.

11. A molding press comprising a frame, an upper mold unit adapted to be supported stationarily on the upper part of said frame, a lower mold unit movable toward and from the upper mold unit, a vertically movable platen on which said lower mold unit is mounted, a hydraulic motor having a vertically movable ram which carries said platen and which has an upwardly facing shoulder, stripper pins movable vertically on said lower mold unit and adapted to eject the formed articles from the lower mold unit, shifting pins slidable vertically on said platen and operating on said stripper pins to lift the same, stationary thrust pins arranged around said ram below said shifting pins, a trip ring surrounding said ram and adapted to be engaged by the shoulder thereof for raising said ring and the latter engaging with the lower end of said shifting pins, operating means for turning said trip ring either into a position in which the same engages its underside with the upper ends of said thrust pins or into a position in which said trip ring clears said thrust pins, actuating means for oscillating said trip ring including a pneumatic motor for holding said trip ring over said stationary thrust pins during the initial part of the downward movement of the ram, and spring means for turning said trip ring from over said thrust pins after the ram has effected the initial part of its downward movement.

12. A molding press comprising a frame, an upper mold unit adapted to be supported stationarily on the upper part of said frame, a lower mold unit movable toward and from the upper mold unit, a vertically movable platen on which said lower mold unit is mounted, a hydraulic motor having a vertically movable ram which carries said platen and which has an upwardly facing shoulder, stripper pins movable vertically on said lower mold unit and adapted to eject the formed articles from the lower mold unit, shifting pins slidable vertically on said platen and operating on said stripper pins to lift the same, stationary thrust pins arranged around said ram below said shifting pins, a trip ring surrounding said ram and adapted to be engaged by the shoulder thereof for raising said ring and the latter engaging with the lower end of said shifting pins, and operating means for turning said trip ring either into a position in which the same engages its underside with the upper ends of said thrust pins or into a position in which said trip ring clears said thrust pins, actuating means for oscillating said trip ring including a pneumatic motor, a rock lever connecting said motor with said ring, and spring means connected with said lever, said motor adapted to move said ring over said stationary thrust pins, and said spring means adapted to move said ring away from said thrust pins.

13. A molding press comprising a frame, an upper mold unit adapted to be supported stationarily on the upper part of said frame, a lower mold unit movable toward and from the upper mold unit, a vertically movable platen on which said lower mold unit is mounted, a hydraulic motor having a vertically movable ram which carries said platen and which has an upwardly facing shoulder, stripper pins movable vertically on said lower mold unit and adapted to eject the formed articles from the lower mold unit, shifting pins slidable vertically on said platen and operating on the said stripper pins to lift the same, stationary thrust pins arranged around said ram below said shifting pins, a trip ring surrounding said ram and adapted to be engaged by the shoulder thereof for raising said ring and the latter engaging with the lower end of said shifting pins, operating means for turning said trip ring either into a position in which the same engages its underside with the upper ends of said thrust pins or into a position in which said trip ring clears said thrust pins, actuating means for oscillating said trip ring including a pneumatic motor for holding said trip ring over said stationary thrust pins during the initial part of the downward movement of the ram, spring means for turning said trip ring from over said thrust pins after the ram has effected the initial part of its downward movement, a conduit for supplying compressed air to said pneumatic motor and containing a valve having a movable valve member for connecting said conduit with or disconnecting the same from said motor and connecting this motor with the atmosphere, and a tappet mechanism whereby said valve is operated during the upward movement of said ram for cutting off the air supply to said pneumatic motor and during the downward movement of said ram admitting the air to said pneumatic motor.

14. A molding press comprising a frame having an upper head and a lower base, a hydraulic motor having a cylinder arranged in the base and a ram movable vertically in the cylinder, a vertically movable platen mounted on the ram, an upper mold unit adapted to be held stationary on the frame head and to be moved laterally therefrom into and out of an inclined position relative thereto, a lower mold unit adapted to be held on said platen in a position parallel with the upper mold unit and to be moved laterally therefrom into and out of an inclined position relative thereto, means for stripping the articles from the lower mold unit after being formed between the mold units including stripper pins mounted on the lower mold unit, and means for actuating said stripper pins including parts mounted on said lower mold unit and parts mounted on said platen, said parts being adapted to cooperate while the mold units are parallel and to be disengaged from one another when the lower mold unit is inclined to the platen.

HARDIN D. THWEATT.
OTTO HOFFMANN.